United States Patent [19]  
Nanba et al.

[11] Patent Number: 4,937,752
[45] Date of Patent: Jun. 26, 1990

[54] AN APPARATUS FOR CORRECTING DISTANCE ERROR IN A NAVIGATION SYSTEM

[75] Inventors: Akimasa Nanba; Mitsuhiro Nimura; Shoji Yokoyama, all of Anjo, Japan

[73] Assignees: Aisin AW Co., Ltd., Anjo; Kabushiki Kaisha Shinsangyokaihatsu, Tokyo, both of Japan

[21] Appl. No.: 290,136

[22] Filed: Dec. 27, 1988

[30] Foreign Application Priority Data

Jul. 18, 1988 [JP] Japan ................................ 63-178427

[51] Int. Cl.$^5$ .............................................. G06F 15/50
[52] U.S. Cl. ..................................... 364/449; 364/457; 340/990; 340/995
[58] Field of Search ............... 364/443, 444, 449, 457; 73/178 R; 340/988, 990, 995

[56] References Cited

U.S. PATENT DOCUMENTS 4,688,176  8/1987  Hirata ..................................... 364/449
4,774,671  9/1988  Itoh et al. ............................... 340/988
4,792,907  12/1988 Ikeda et al. ............................. 364/449
4,796,189  1/1989  Nakayama et al. ................... 364/444
4,812,845  3/1989  Yamada et al. ...................... 73/178 R
4,814,989  3/1989  Dobereiner et al. ................. 364/449

Primary Examiner—Gary Chin
Attorney, Agent, or Firm—Varndell Legal Group

[57] ABSTRACT

In a navigation system, during navigation between guidance intersections A and B, a next named intersection C is displayed along with the distance remaining until the named intersection B is reached. After the vehicle has entered the distance error correction range, illumination color of the display of the next named intersection C is changed into, for example, red. If a corresponding portion of the display screen is touched at the time of passage though the intersection, a distance error is corrected. The invention thus makes it possible to readily correct distance errors with accuracy. Even during navigation along a straight road, distance correction can be performed at specific intersections. The invention also makes it possible to track the present position with accuracy by increasing the frequency of distance error correction.

7 Claims, 11 Drawing Sheets

| INTERSECTION NUMBER | NAME OF INTERSECTION | ROAD HAVING THE SMALLEST NUMBER AMONG THE ROADS WHICH START FROM THIS INTERSECTION | ROAD HAVING THE SMALLEST NUMBER AMONG THE ROADS WHICH ENDS AT THIS INTERSECTION | WITH OR WITHOUT SIGNAL |
|---|---|---|---|---|
| I | KANDA | ① | ② | WITH SIGNAL |
| II | YUSHIMA | ② | ① | WITH SIGNAL |
| III | ○○ | ④ | ③ | WITHIOUT SIGNAL |
| IV | △△ | ⑥ | ⑥ | WITHIOUT SIGNAL |

Fig. 4

| ROAD NUMBER | STARTING POINT | ENDING POINT | ONE OF THE ROADS WHICH START FROM THE SAME STARTING POINT | ONE OF THE ROADS WHICH END AT THE SAME ENDING POINT | WIDTH OF ROAD | PROHIBITION ① | PROHIBITION ② | NOT GUIDED | PHOTO NUMBER | NUMBER OF NODES | TOP ADDRESS OF NODE SERIES DATA | LENGTH |
|---|---|---|---|---|---|---|---|---|---|---|---|---|
| ① | I | II | ⑦ | ④ | 1 | — | — | ③ | 1 | 15 | 100 | |
| ② | II | I | ③ | ⑧ | 1 | — | — | ⑦ | 2 | 13 | 200 | |
| ③ | II | III | ② | ③ | 2 | — | — | ⑤ | 3 | 9 | 300 | |
| ④ | III | II | ⑤ | ⑥ | 2 | — | — | ② | 4 | 20 | 500 | |
| ⑤ | III | IV | ④ | ⑦ | 2 | ⑥ | — | ⑧ | 5 | 25 | 600 | |
| ⑥ | IV | II | ⑧ | ① | 1 | ③ | ② | — | 6 | 30 | 700 | |
| ⑦ | I | IV | ① | ⑤ | 0 | — | — | — | 7 | 9 | 800 | |
| ⑧ | IV | I | ⑥ | ② | 0 | — | — | ① | 8 | 3 | 900 | |

Fig. 5

| ADDRESS | EAST LONGITUDE | NORTH LATITUDE | ATTRIBUTE |
|---|---|---|---|
| | 135.5 | 35.1 | 01 |
| | 135.6 | 35.2 | 01 |
| 100 | | | |
| 200 | | | |

Fig.6(a)

| |
|---|
| INTERSECTION NAME |
| INTERSECTION NUMBER |
| PHOTOGRAPH NUMBER |
| ANGLE |
| DISTANCE |
| INTERSECTION NAME |

Fig.6(b)

| |
|---|
| EAST LONGITUDE |
| NORTH LATITUDE |
| INTERSECTION NUMBER |
| ATTRIBUTE |
| ANGLE |
| DISTANCE |
| EAST LONGITUDE |

GUIDANCE NODE ROAD NUMBER ARRAY

| ARRAY NO. | ROAD NUMBER |
|---|---|
| 0 | 1 |
| ⋮ | ⋮ |
| 7 | 23 |
| 8 | 2 |
| 9 | 13 |
| 10 | 30 |
| 11 | 9 |
| 12 | 28 |
| ⋮ | ⋮ |

GUIDANCE NODE INFORMATION ARRAY

| TERMINAL POINT INTERSECTION NAME | NODE INTERVAL | |
|---|---|---|
| ⋮ | ⋮ | |
| OGAWA-MACHI | 213 | |
|  | 188 | |
| GYOLIN | 315 | |
| ISHI-MACHI | 250 | |
| ISHI-MACHI-KITA | 221 | |
|  | 98 | |
| ⋮ | ⋮ | |

AN APPARATUS FOR CORRECTING DISTANCE ERROR IN A NAVIGATION SYSTEM

BACKGROUND OF THE INVENTION

This invention relates to an apparatus for correcting a distance error such as discordance between the present position and the point indicated on a map to represent the present position in a system for performing navigation along a predetermined course.

A method of computing the present position during the operation of a veicle navigation system is known which makes use of a distance sensor for detecting the distance through which the vehicle has traveled, an orientation sensor such as an earth magnetism sensor or gyroscope for detecting the direction of traveling of the vehicle and a map memory unit having a video disk, video tape, CD-ROM or the like. In this method, an image of a map of a particular region is displayed on the basis of corresponding map data read from the map memory unit when required, and the travel locus and the present position of the vehicle are displayed on the display screen, thereby enabling the driver to confirm with the eye the indicated position and ascertain the present position. If there in an error in the indication of the present position, the driver corrects the position of the indication point by moving the same with a cursor or the like.

In such a system of displaying the predetermined travel course and the travel locus, however, the accuracy with which the present position is detected is not sufficient because there is a possibility of occurrence of an error in the detection of orientation if the the earth sensor is used to detect earth magnetism in a particular area where the degree of magnetic disturbance is high, for example, a place near a railroad crossing, a railroad or a power cable. Also, such an error may be caused by magnetization of the vehicle body. The above system is also defective in that the cost of the gyroscope is high and that the method of correcting the present position on the basis of comparison between the calculated positional value and the map data requires a large quantity of data, resulting in an increase in the time taken for computation.

In the method of effecting correction by moving the indication point with a cursor or the like, the positioning is troublesome and cannot easily be performed with desired accuracy.

In consideration of these problems, the applicant of the present invention has proposed in Japanese Patent Application No. 62-333046 a navigation system in which passage through each of intersections on the course is detected to enable distance correction to be performed at each intersection with improved accuracy without influence of disturbance. However, if the interval between intersections where the vehicle turns is large, it is not possible to perform distance correction, resulting in an increase in the accumulated error.

SUMMARY OF THE INVENTION

It is an object of the present invention to provide a navigation system capable of correcting a distance error in a simple manner with improved reliability.

It is another object of the present invention to provide a navigation system capable of correcting a distance error even during traveling through a straight road.

It is still another object of the present invention to provide a navigation system which enables the driver to be easily confirm that the vehicle has entered a distance error correction range of a named intersection or a specific object.

It is a further object of the present invention to provide a navigation system which enables the driver to be easily confirm that the vehicle has entered and passed a distance error correction range of a named intersection or a specific object.

It is a still further object of the present invention to provide a navigation system which enables distance correction to be performed when the vehicle enters and passes a distance error correction range of a named intersection or a specific object.

To these ends, the present invention provides a distance error correction method for a system for performing navigation along a predetermined route having a distance sensor for detecting the present position, a route searching section for searching routes on the basis of the present position, intersection data, road data and node data, and a comparison/determination section for determining whether or not the remaining distance between the present position and a named intersection or a specific object of a route selected by searching is zero, which includes resetting the present position to correct distance error on the basis of data on the positions of nodes when the vehicle enters the distance error correction range of the named intersection or specific object and passes therethrough.

BRIEF DESCRIPTION OF THE DRAWINGS

FIG. 4 is a table of data on roads;

FIG. 5 is a table of data on series of nodes;

FIG. 6(a) is a table of a searched guidance intersection data;

FIG. 6(b) is a diagram of a searched course node series data;

FIGS. 13(a), 13(b), and 14 are diagrams illustrating an example of processing of the distance error correction method.

DESCRIPTION OF THE PREFERRED EMBODIMENT

An embodiment of the present invention will be described below with reference to the accompanying drawings.

Figure 1:
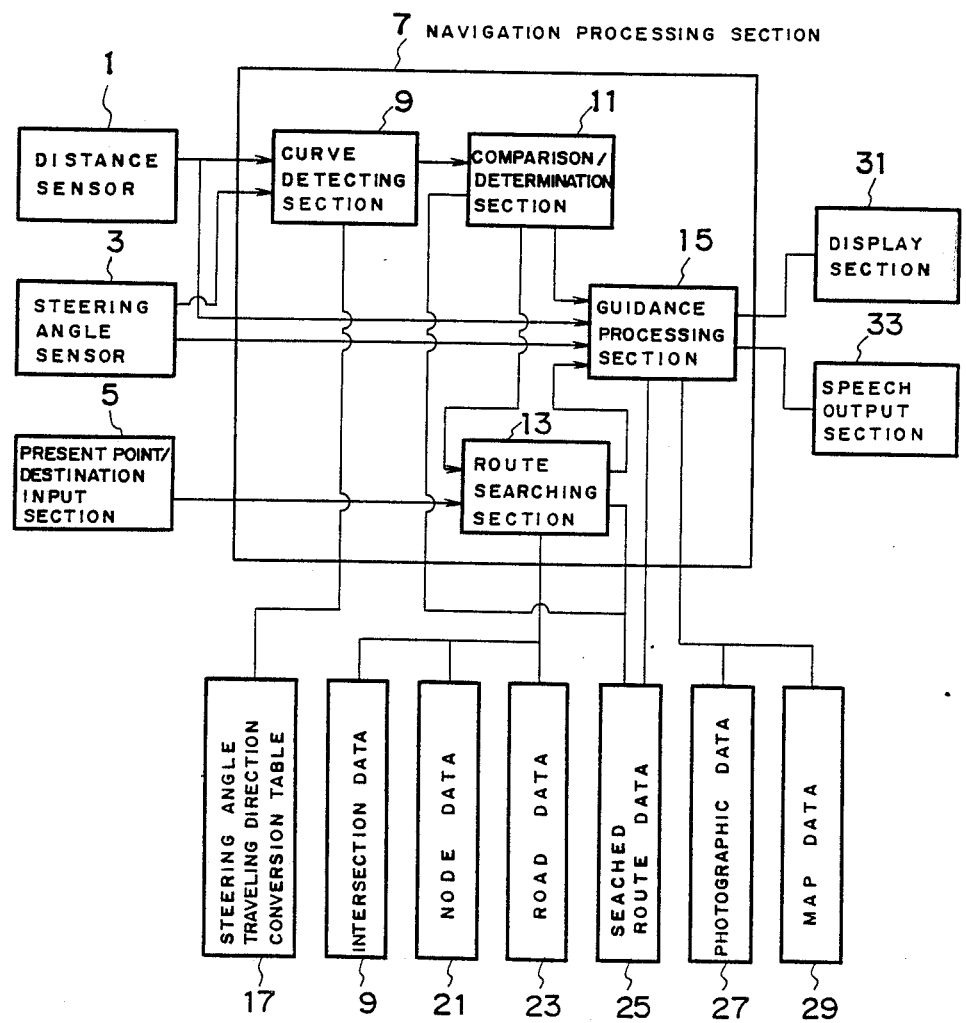
FIG. 1 is the construction of a navigation system to which the present invention is applied.

Referring to FIG. 1, the construction of a vehicle navigation system to which the present invention is applied is illustrated. The navigation system has a distance sensor 1, a steeling angle sensor 3, a present point/destination input section 5, a navigation processing section 7, a curve detecting section 9, a comparison/determination section 11, a route searching section 13, a guidance processing section 15, a steeling angle-traveling direction conversion table 17, an intersection data file 19, a node series data file 21, a road data file 23, a searched route data file, a photographic data file 27, a map data file 19, a display section 31, and a speech output section 33.

The distance sensor 1 is adapted to measure the distance through which the vehicle has traveled. The distance sensor 1 may be a means for detecting the number of revolutions of a wheel, a means for detecting the acceleration and integrating a detected value two times, or other measuring means.

The steering angle sensor 3 which detects whether or not the vehicle has turned a corner may be constituted by an optical rotary sensor, a rotary variable resistor or the like attached to, for example, a rotary member of the steering wheel or may be an angle sensor attached to the steering system.

The present point/destination input section 5 is constituted by a joy stick, a key cluster or a touch panel and is used, in combination with the screen of the display section 31, to show keys and a menu on the screen and enable input through the screen.

The navigation processing section 7 is the center of the navigation system, and has the curve detecting section 9, the comparison/determination section 11, the route searching section and the guidance processing section 15.

The route searching section 13 reads out later-described intersection data, node data and road data from the corresponding files to perform roue searching when supplied with a present point and a destination point from the input section 5. The route searching section 13 thereafter stores searched routes in the file 25.

The curve detecting section 9 reads detection outputs from the distance sensor 1 and the steeling angle sensor 3 and detects a change in the vehicle orientation by referring to the steering angle-traveling direction conversion table 17.

The comparison/determination section 11 compares an angle detected by the curve detecting section 9 with an intersection angle or node angle of a route identified by searching while the vehicle travels near a guidance intersection or between guidance intersections on the course. If the difference between these angles is not larger than a predetermined value, the comparison/-determination section 11 determines that the vehicle has correctly turned at the intersection or node.

The guidance processing section effects distance correction on the basis of the intersection data or node data to calculate the present position when the comparison/-determination section 11 has determined that the vehicle has correctly turned or when a correction command is issued from the route searching section 13 at a particular point, e.g., an intersection. In this case, the present position is calculated as the distance from the intersection passed at the preceding time. The guidance processing section 15 displays the present position or outputs an audio message if necessary. Also, the guidance processing section 15 successively displays photographs showing intersections of the selected route and landmarks or the like located at intermediate points on the course, as well as the distance remaining until the next intersection is reached and other items of guidance information, while making the speech output section 25 output audio guidance. If any deviation from the course is detected, the guidance processing section 15 makes a display indicating deviation from the course while outputting a corresponding audio message to inform the driver of this state.

Next, the intersection data, node data and road data used for route searching will be described below.

The intersection data includes items of information on roads crossing at intersections, the node data includes items of information on specific points on the course such as pedestrian crossings and tunnels, and the road data includes items of information on roads with respect to starting and terminal ends thereof and so forth.

FIGS. 2 to 5 are diagrams or tables showing examples of the road system, the intersection data, road data and the node series data.

Figures 2, 3:
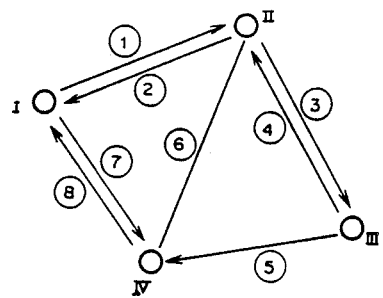
FIG. 2 is a diagram of a road system.
FIG. 3 is a table of data on intersections.

If the road network is represented by intersection numbers I to IV and road numbers ① to ⑧, as shown in FIG. 2, intersection data items such as those shown in FIG. 3; road data items such as those shown in FIG. 4; and node data items such as those shown in FIG. 5 are used to constantly detect the distance between the present position of the vehicle and the destination with accuracy.

That is, as shown in FIG. 3, the intersection data is constituted by, in correspondence with intersection numbers I to IV, intersection names, numbers each of which is the smallest of road numbers designating roads starting from one of the intersections I to IV, numbers each of which is the smallest of road numbers designating roads terminating at one of intersections I to IV, and values each representing existence or absence of traffic signals.

As shown in FIG. 4, the road data is constituted by, in correspondence with road numbers ① to ⑧, starting and terminal points indicated by intersection numbers I to IV, numbers each of which corresponds to the second of road numbers designating roads having the same starting point, numbers each of which corresponds to the second of road numbers designating roads having the same terminal point, the widths of the roads, prohibition information, free-of-guidance information, photograph numbers, the numbers of nodes, top addresses of node series data, and the lengths of the roads.

The node data is constituted by east longitudes, north latitudes and attributes, as shown in FIG. 5. As is apparent from the road data, the unit road indicated by each road number is defined by a plurality of nodes. That is, the node data relates to points on the roads. If something connecting a pair of nodes is called an arc, a road can be expressed by connecting, with an arc, each of adjacent pairs of nodes constituting a series of a plurality of nodes. For example, with respect to road number ①, the number of nodes is 15 and the top address of the corresponding node data items is 100. The road number ① therefore designates a series of fifteen nodes represented by node data items with addresses 100 to 114.

On the basis of the above-described network data, with respect to a course starting from, for example, intersection number I, a road number ① is first found from starting point information of the intersection data, and road number ⑦ is then found as a "second of road numbers designating roads having same starting point" of the road data. Conversely, from the corresponding information relating to road number ⑦, road number ① is found, thereby determining that there is no connecting roads represented by other road numbers. Data items relating to terminal points can be read out in a similar manner. With respect to the road number ⑤ in the road data, the road number ⑥ designates prohibition. Correspondingly, in the network shown in FIG. 2, travel along a route indicated by the road numbers ⑤ and ⑥ through the intersection indicated by the intersection number IV is prohibited due to the existence of no-left/right-turn prohibition. Only travel along a route indicated by the road number ⑧ is allowed. Therefore there is no need for guidance in the direction of the road number ⑧.

FIG. 5 shows examples of items of data prepared by route searching: intersection series data (a); and node series data (b). The intersection series data is constituted by various items including intersection names, intersection numbers, photograph numbers indicating photographs of specific views of intersections, turning angles and distances. As shown in FIG. 5(b), the node series data is constituted by east longitudes and north latitudes representing the positions of nodes, intersection numbers, attributes, angles and distances. These items of data are provided only for intersections where guidance is needed except for guidance-free intersections. During navigation, therefore, it is sufficient to read out and output these items of data in correspondence with the predetermined positions.

In the navigation system in accordance with the present invention, the vehicle is tracked with accuracy during traveling and the present position of the vehicle is ascertained with accuracy at all times on the basis of the intersection data, road data and node series data.

Next, the distance error correction method for the navigation system of the present invention will be described below.

Figure 7:
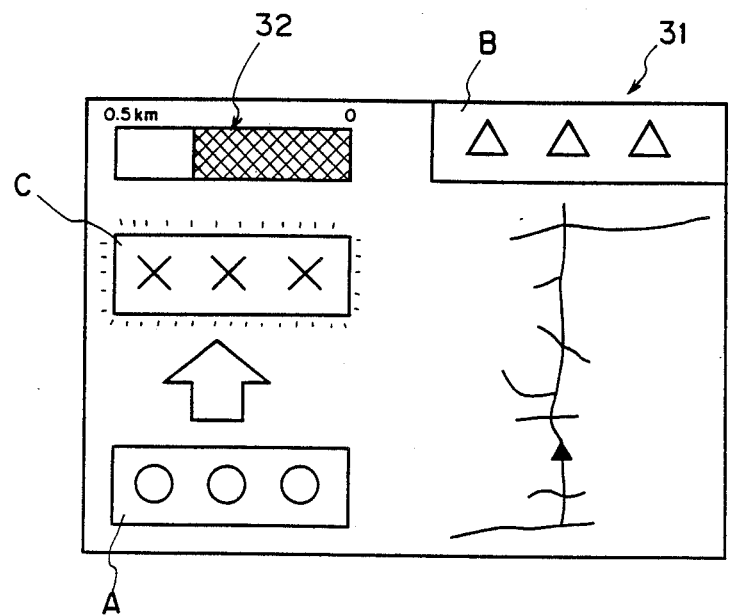
FIGS. 7 and 8 are diagrams of an examples of a display window on the display screen.
Figure 8:
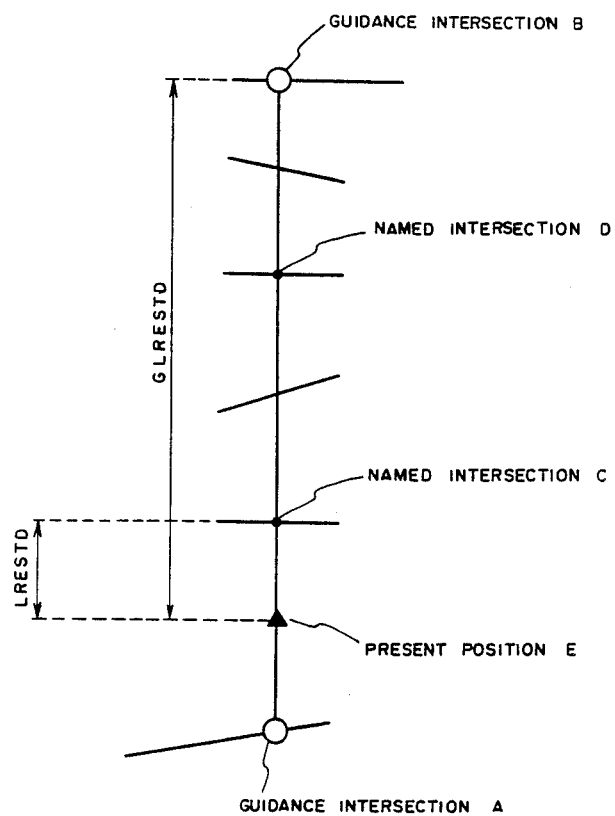

FIGS. 7 and 8 show an example of guidance route displayed on the screen by the display section 31. FIG. 7 shows symbols or illustrations relating to straight-ahead travel from a guidance intersection A to another guidance intersection B. The next named guidance intersection B can be displayed while the remaining distance to another named intersection C is displayed in an indicator 32. As the vehicle approaches the guidance intersection B, this window is closed and another window, in which the remaining distance, the direction in which the vehicle is to be turned, a view of the inter section are displayed, is then opened. Reference characters C and D designate named intersections, and a reference character E designates the present position displayed. (See, for example, FIG. 8.) A signal can be input in a touch-panel input manner through the portion of the display screen where the named intersection C is displayed. As described later, when the vehicle enters a distance error correction range, the color of the display portion of the next named intersection C changes to, for example, red, and distance correction is performed if this portion of the display is touched when the vehicle passes through the intersection.

Next, the control flow of the distance error correction method for the navigation system in accordance with the present invention will be described with reference to FIG. 9 to 12.

Figure 9:
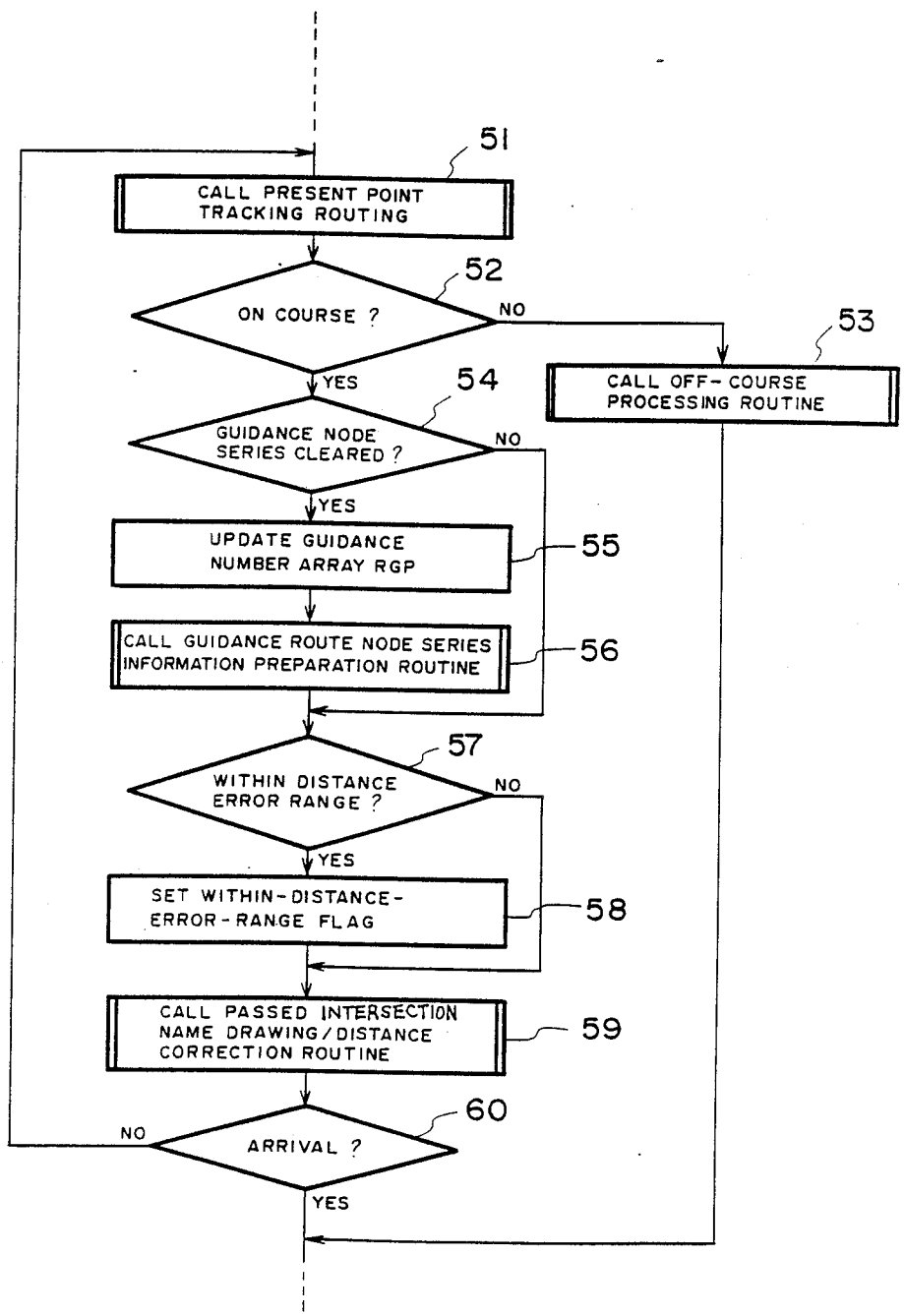
FIGS. 9 to 12 are flow charts of a distance error correction method for the navigation system of the present invention.

In accordance with the overall flow shown in FIG. 9, the present point tracking routine is called in step 51 to track the present position and display the position of the vehicle on the display screen. In step 52, whether or not the vehicle is traveling on the course is determined. If it is determined that the vehicle has not deviated from the course, whether or not the series of guidance nodes has been cleared is determined in step 54. If NO, the process jumps to step 57. If YES, a present position guidance route array number RGP (FIG. 13) is updated in step 55. Then, in step 56, a node series preparation routine is called. In step 57, whether or not a distance error range flag FLIMIT is 0 or whether or not the vehicle position is within the distance error correction range is determined. That is, determination is made as to whether or not distance between a remaining guidance route node distance LRESTD between the present position E and the named intersection C shown in FIG. 8 is equal to or smaller than 10% of the distance between the intersections A and C. If NO, the process directly proceeds to step 59. If YES, the distance error range flag FLIMIT is set to 1 at step 58. Then, in step 60, whether or not the vehicle has arrived is determined. If NO, the above process is repeated or, if YES, a desired succeeding process is started.

Figure 10:
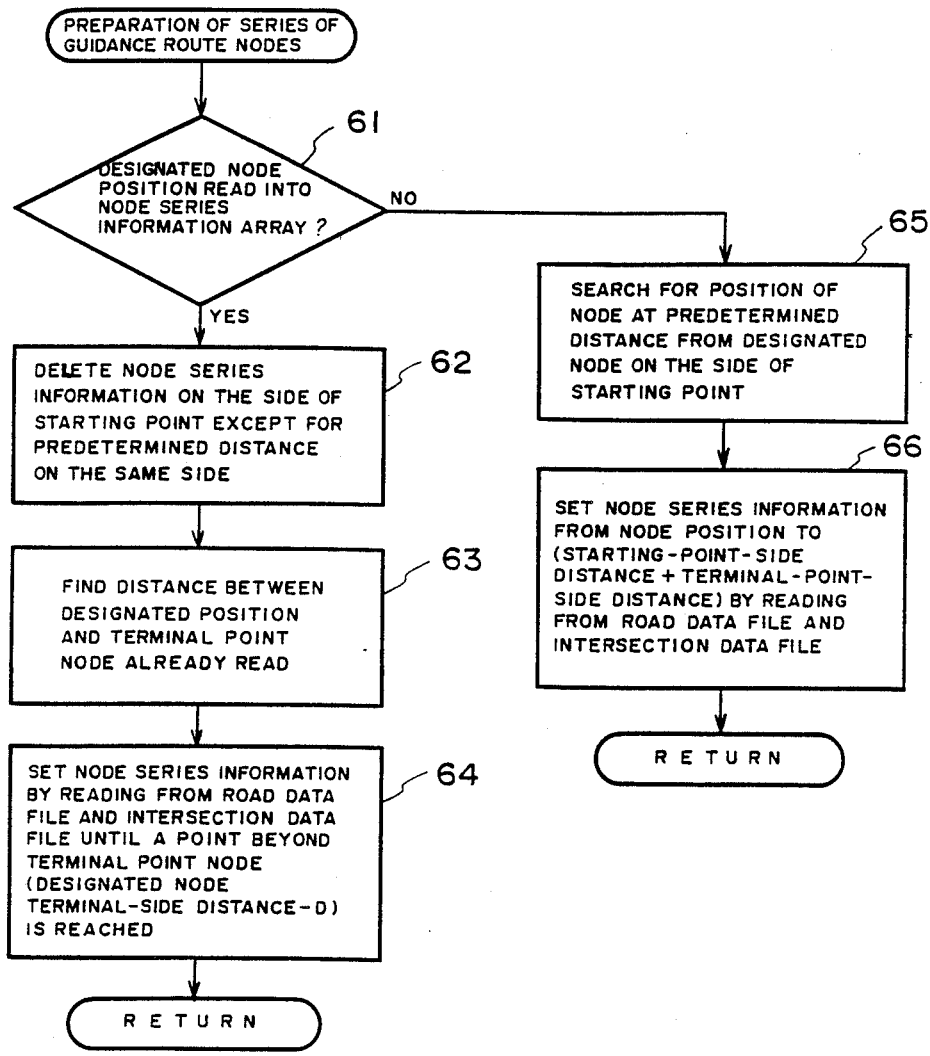

FIG. 10 shows the guidance route node series preparation routine of step 56. In step 61 of this routine, whether or not the position of a designated node has been read to the node series information array is determined. If YES, node series information on the side of starting point relative to the designated point is deleted in step 62. Then, in step 63, the distance between the designated position and a terminal point node which has already been read is obtained. In step 64, node series information is set by being read from the road data file and the intersection data file until a point beyond the terminal point node (designated node terminal-side distance—D). If NO in step 61, the position of node at the predetermined distance from the designated node on the side of the starting point is detected in step 65. In step 66, node series information from node position to (starting-point-side distance to terminal-point-side distance) is set by being called form the road data file and the intersection data file.

Figure 11:
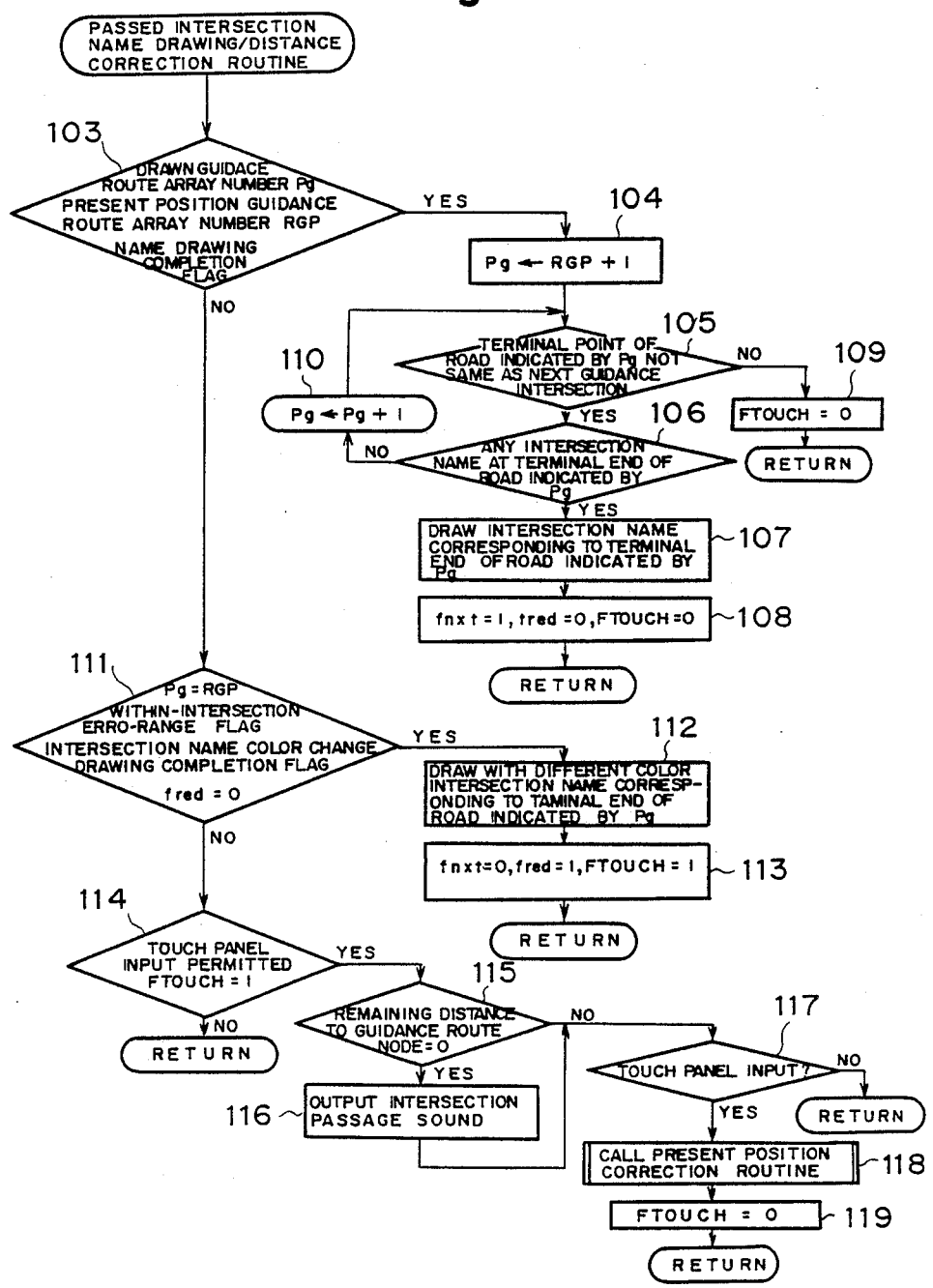

FIG. 11 shows the flow chart of the distance correction of step 59 shown in FIG. 9.

In step 103, a drawn guidance route array number Pg is smaller than the present position guidance route array number RGP or whether or not a name drawing completion flag fnxt is 0 is determined. In other words, a determination is made as to whether or not the name of the next intersection on the road passed at the present time has previously been drawn with respect to the corresponding road number.

In the case of YES, that is, no name has been drawn, 1 is added to RGP, and Pg is set a new value of RGP thereby obtained. Then, in step 105, whether or not the terminal point of the road indicated by the road number corresponding to Pg corresponds to the next guidance intersection B (FIG. 8) is determined. If NO, a touch panel input permission flag FTOUCH is set to 0 and the process returns. If YES, whether or not there is any intersection name for the terminal point of the road corresponding to Pg is determined in step 106. If there is no intersection name, Pg is incremented in step 110 and the above processing is repeated. If an intersection name is found in step 106, the name of the intersection (FIG. 7) corresponding to the terminal point of the road indicated by Pg is drawn in step 107. In step 108, the name drawing completion flag fnxt is set to 1, an intersection name color change drawing completion flag fred is set to 0, and the touch panel input permission flag FTOUCH is set to 0. The process then returns.

If NO in step 103, whether or not Pg and RGP are equal to each other, that is, whether or not the road for which the intersection name has been drawn is traveled is determined in step 111. Determination is also made as to whether or not the intersection error range flag FLIMIT is 1 and whether or not the intersection name color change drawing completion flag fred is 0. If YES, the name of the intersection (FIG. 7) of the road indicated by Pg is drawn with a different color or with on-and-off illumination in step 112. In step 113, the name drawing completion flag fnxt is set to 0, the intersection name color change drawing completion flag fred a is set to 1, and the touch panel input permission flag FTOUCH is set to 1. The process then returns.

If No in step 111, whether or not the touch panel input permission flag FTOUCH is set to 1 is determined in step 114. If NO, the process returns. If YES, whether or not the remaining guidance route node distance is 0 is determined in step 115. If the distance is 0, an intersection passage audio is output in step 116, and whether or not the driver has effected touch panel input at the intersection is determined in step 117. If No, the process returns. If YES, the present position correction routine of step 118 is called, the touch panel input permission flag FTOUCH is set to 0, and the process returns.

Figures 12, 13:
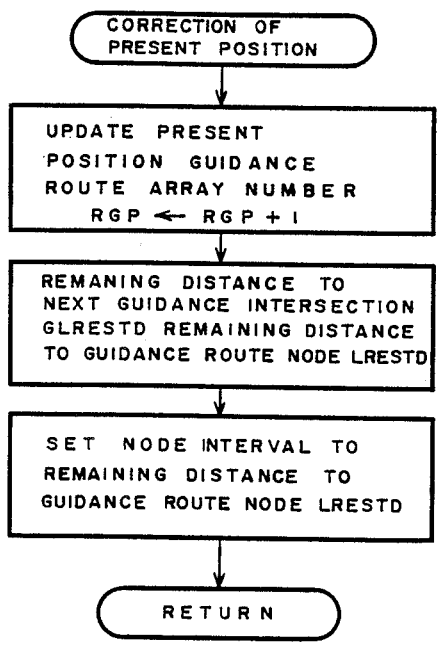

FIG. 12 shows the present position correction routine of step 118 in the previous figure.

In this routine, 1 is added to the present position guidance route array number RGP to update the same. Thereafter, the remaining guidance route node distance LRESTD is subtracted from the remaining distance GLRESTD (FIG. 8) to the next guidance intersection, and the node interval is set as the remaining guidance route node distance LRESTD.

An example of processing in accordance with the above-described process will be described below with reference to FIGS. 13 and 14.

FIG. 13(a) shows a guidance node road number array file prepared in the processing shown in FIG. 10 and shows the relationship between the array numbers and road numbers assigned to Pg and RGP during traveling along the guidance route. FIG. 13(b) shows a guidance node information array file in which data on terminal intersection names and data on node intervals are stored.

Figure 14:
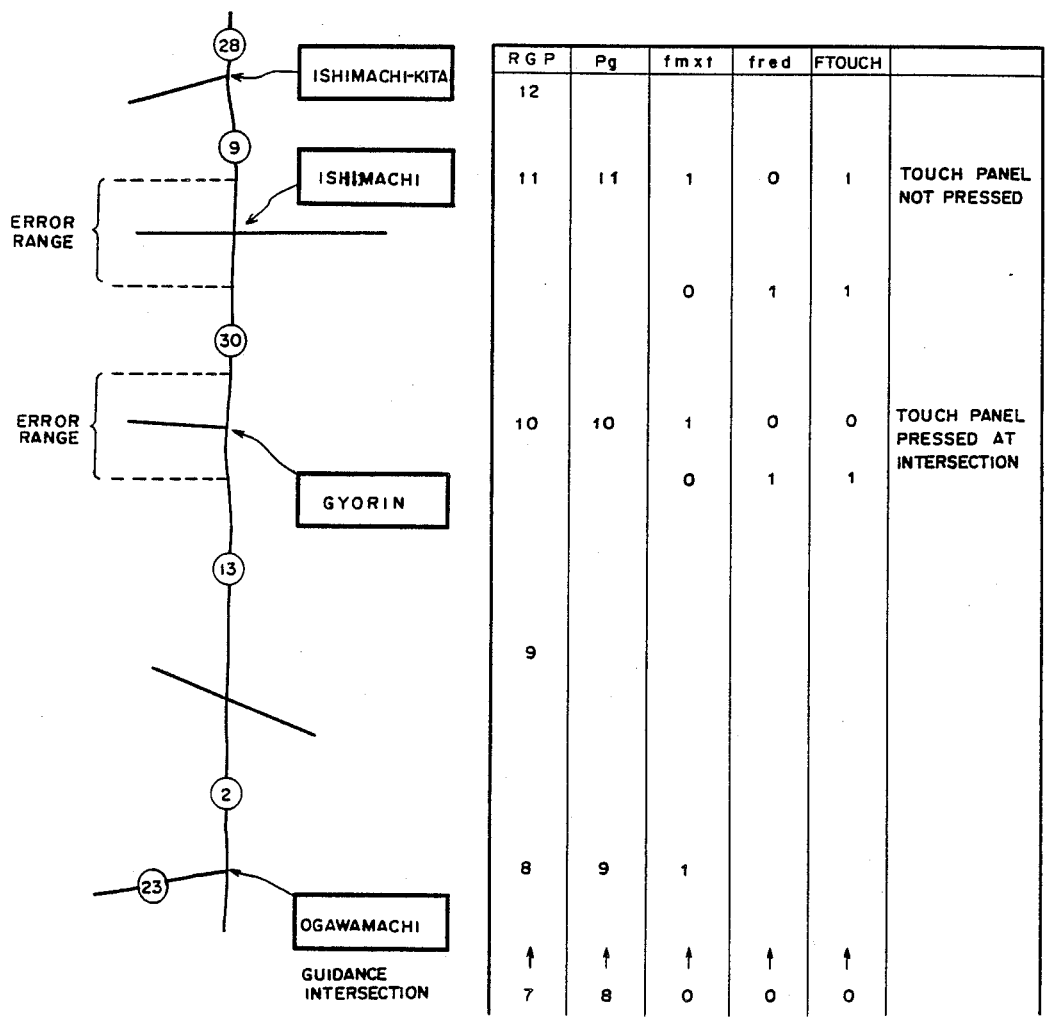

FIG. 14 shows changes in the array numbers Pg and RGP, the name drawing completion flag fnxt, the intersection name color change drawing completion flag fred and the touch panel input permission flag FTOUCH. Numbers with circles and intersection names on the guidance route correspond to the road numbers and intersection names shown in FIG. 13.

When the vehicle is traveling on the road indicated by the road number 2, RGP is 8 while Pg is 9. The process therefore proceeds from step 103 to step 104, RGP is set to 9, and "Gyorin" is drawn. At the same time, fnxt is set to 1, fred to 0, and FTOUCH to 0. When the vehicle enters the error range of the intersection "Gyorin" after transferring to the road indicated by the road number 13, FLIMIT=1 is established and the process proceeds from steps 112 and 113, thereby setting fnxt to 0, fred to 1, and FTOUCH to 1. If the touch panel is pressed, RGP is set to 10 by being updated by the processing of FIG. 10, and Pg is also set to 10 in step 104 by the determination of step 103.

The present invention is not limited to the above-described embodiment and it can be modified in various ways. In the above-described embodiment, the error correction range is set within 10% of the distance between a previously passed intersection and the next named intersection. Instead, the error correction range may be set within a predetermined distance from each named intersection. Distance correction is performed at each intersection in the described embodiment, but it can also be performed on the basis of the position of a specific object such as a river, a railroad or a building as long as the position thereof can be ascertained.

What is claimed is:

1. A distance information correction device for use in a navigation apparatus for guiding a vehicle, having a distance sensor for detecting a present position of said vehicle, and a route searching means for providing a route of travel to a guidance point on the basis of said detected present position, intersection data, road data and node data, said node data including information about points along a road and distances therebetween; said distance information correction device comprising:
   first distance determining means for determining a distance of said vehicle from said detected present position to a next node along said route of travel and whether said determined distance is within a predetermined range of distance error correction;
   second distance determining means for determining whether said determined distance equals zero;
   display means having a first output means for displaying information about said next node relative to said detected present position, second output means for outputting information about distance error correction when said determined distance is within said predetermined range of distance error correction, and third output means for outputting information about zero distance when said determined distance between said detected present position and said next node equals zero;
   input means for permitting a driver of said vehicle to input a node passage information when said vehicle passes said next node as displayed by said first output means; and
   distance error correction means for correcting any error in travel distance to said guidance point by correcting said travel distance based upon said distances contained within said node data when said node passage information is input through said input means.

2. A distance information correction device for use in a navigation apparatus according to claim 1, wherein said third output means includes means for audio output.

3. A distance information correction means for use in a navigation apparatus according to claim 1, wherein the information output by said second output means modifies a portion of the information output by said first output means.

4. A distance information correction device for use in a navigation apparatus according to claim 1, wherein said input means includes a touch panel.

5. A distance information correction device for use in a navigation apparatus according to claim 1, wherein said next node is an intersection.

6. A distance information correction device for use in a navigation apparatus according to claim 1, wherein said next node is a geographical landmark.

7. A distance information correction device for use in a navigation apparatus according to claim 1, wherein said guidance point is a guidance intersection.

* * * * *